(12) United States Patent
Song et al.

(10) Patent No.: US 11,754,153 B2
(45) Date of Patent: Sep. 12, 2023

(54) DISTRIBUTED ACTIVE/PASSIVE HYBRID CABLE DRIVE SYSTEM

(71) Applicant: SOUTHEAST UNIVERSITY, Nanjing (CN)

(72) Inventors: Aiguo Song, Nanjing (CN); Ke Shi, Nanjing (CN); Ye Li, Nanjing (CN); Huijun Li, Nanjing (CN); Yunxia Ouyang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 33 days.

(21) Appl. No.: 16/975,099

(22) PCT Filed: Apr. 22, 2020

(86) PCT No.: PCT/CN2020/086151
§ 371 (c)(1),
(2) Date: Aug. 21, 2020

(87) PCT Pub. No.: WO2021/012730
PCT Pub. Date: Jan. 28, 2021

(65) Prior Publication Data
US 2023/0151877 A1    May 18, 2023

(30) Foreign Application Priority Data

Jul. 24, 2019 (CN) .......................... 201910669394.2

(51) Int. Cl.
*F16H 19/06* (2006.01)
*B25J 9/10* (2006.01)

(52) U.S. Cl.
CPC .......... *F16H 19/0645* (2013.01); *B25J 9/104* (2013.01)

(58) Field of Classification Search
CPC ............ F16H 19/0618; F16H 19/0622; F16H 19/0645; B25J 9/104
See application file for complete search history.

(56) References Cited

U.S. PATENT DOCUMENTS

| 9,744,404 B2* | 8/2017 | Shiao ............... A63B 21/00845 |
| 9,995,269 B2* | 6/2018 | Sung ................... F16H 19/0622 |
| 10,228,054 B1* | 3/2019 | Wittig ..................... F16H 57/12 |
| 10,525,588 B2* | 1/2020 | Plante ..................... F16D 37/02 |
| 2011/0126650 A1* | 6/2011 | Sorensen ............ F16H 19/0636 |
| | | 29/401.1 |

(Continued)

*Primary Examiner* — Bobby Rushing, Jr.
(74) *Attorney, Agent, or Firm* — CBM Patent Consulting, LLC

(57) ABSTRACT

The present invention discloses a distributed active/passive hybrid cable drive system, including a direct current motor, a magnetorheological actuator module, and a drive gear set. The direct current motor provides power for the system, the magnetorheological actuator adjusts output, a cable is driven to move by using a reel fixedly connected to an output shaft, the power is transmitted to a tail end by using the cable along a Bowden cable, and the tail end is connected to a controlled object, to implement control. The distributed active/passive hybrid cable drive system can implement controllable force output with large torque, small inertia, and high bandwidth, and has a small volume, high efficiency, and low costs compared with a pure motor drive system.

6 Claims, 4 Drawing Sheets

(56) References Cited

U.S. PATENT DOCUMENTS

2016/0121899 A1* 5/2016 Wankhede ............. B60K 17/28
            701/67
2018/0214730 A1* 8/2018 LaRose ................ A61H 1/0237
2020/0049217 A1* 2/2020 Bai ........................ F16D 67/06
2021/0387351 A1* 12/2021 Wang .................... B25J 9/0078

* cited by examiner

DISTRIBUTED ACTIVE/PASSIVE HYBRID CABLE DRIVE SYSTEM

FIELD OF TECHNOLOGY

The present invention belongs to the intelligent robot technologies, and specifically, relates to a distributed active/passive hybrid cable drive system.

BACKGROUND

Cable parallel robots are widely applied to industrial transportation, medical rehabilitation, aerospace, and other fields because the cable parallel robots have a rear drive system and low output inertia, and are convenient and flexible to install and use.

The drive system for cable parallel robots usually consists of a motor, which rotates and pulls a cable to provide required cable tension. However, ordinary direct current motors cannot work in reverse and locked-rotor modes for a long time (because ordinary direct current motors generate severe heat and coil windings are burned out when they are locked or reversed for a long time), which does not facilitate long-term use of cable robots. The torque motor has high costs, a large volume, and high inertia, which does not help control cable tension.

SUMMARY

Objective of the present invention: The objective of the present invention is to provide a distributed active/passive hybrid cable drive system, to overcome disadvantages existing in the prior art.

Technical solutions: A distributed active/passive hybrid cable drive system in the present invention includes a direct current motor, a motor output gear, a plurality of drive gear sets, and a plurality of magnetorheological actuator modules, where the direct current motor is separately connected to each drive gear set for driving, and each drive gear set is linked to the corresponding magnetorheological actuator module; each drive gear set includes a motor drive gear, a drive shaft, and a magnetorheological drive gear, the motor output gear is connected to an output end of the direct current motor, the motor output gear is meshed with the corresponding motor drive gear, the motor drive gear is installed on the drive shaft, and the drive shaft is provided with a plurality of magnetorheological drive gears; and each magnetorheological actuator module includes a module frame, and a rotary magnetorheological actuator, an output reel, and a magnetorheological input gear that are installed in the module frame; the magnetorheological input gear is fixed on the rotary magnetorheological actuator and is capable of rotating around the module frame, the magnetorheological input gear is meshed with the corresponding magnetorheological drive gear, an output end of the rotary magnetorheological actuator is fixedly connected to the output reel, output torque of the output reel is determined by adjusting damping of the magnetorheological actuator, the output reel pulls a cable connected to the output reel, and the cable receives power and transmits the power along a Bowden cable to a controlled object at a tail end, to control the controlled object.

Extension and shortening of the cable is achieved by using the reel of the magnetorheological output end.

An encoder is further disposed on each magnetorheological actuator module, the encoder is installed on the module frame and communicates with the reel, and the encoder measures a rotation angle of the output reel, to measure a telescopic length of the cable.

Further, the direct current motor provides power, and transfers the power to the magnetorheological actuator module by using the motor output gear, the motor drive gear, the drive shaft, and the magnetorheological drive gear, the magnetorheological actuator module is integrated with the magnetorheological drive gear by using the magnetorheological input gear, and receives the power, then the rotary magnetorheological actuator rotates around the module frame, then the output torque of the output reel is determined by adjusting the damping of the magnetorheological actuator, the output reel pulls the cable, and the cable receives power to transfer the power along the Bowden cable to the controlled object at the tail end, to control the controlled object.

Further, there are two drive gear sets in total, and there are four magnetorheological actuator modules in total; motor drive gears in the two drive gear sets are respectively meshed with two ends of the motor output gear, each motor drive gear is connected to the corresponding drive shaft, two magnetorheological drive gears are disposed on each drive shaft, and four magnetorheological drive gears are respectively meshed with the magnetorheological input gear in each magnetorheological actuator module.

Further, a plurality of magnetorheological drive gears are disposed on the drive shaft, and a quantity of magnetorheological drive gears corresponds to a quantity of magnetorheological actuator modules. A quantity of output ends of the entire drive system may be randomly increased or decreased. A drive rod is extended, and a quantity of drive gears and a quantity of magnetorheological actuator modules are increased, so as to increase the quantity of output ends. A sum of output power of all the output ends should be less than or equal to power of the used direct current motor.

Beneficial effects: The direct current motor in the present invention is powered on to rotate, and each of the rotary magnetorheological actuators is driven to rotate by using the motor output gear, the motor drive gear, the drive shaft, the magnetorheological drive gear, and the magnetorheological input gear. Output damping of each of the rotary magnetorheological actuators is controlled, to control the output reel fixedly connected to the output shaft of the magnetorheological actuator to generate different power to pull the cable. The cable receives the power and transmits the power along the Bowden cable to the controlled object at the tail end, thereby controlling the controlled object. Compared with the prior art, the present invention has the following advantages:

1. A system output rotation speed can be decoupled from torque, that is, the output torque is only related to magnetorheological controllable output damping, the rotation speed is only related to a motor speed, and the motor speed is not controlled. The direct current motor is selected only as an output power source, and has no requirement for motion precision and other parameters of the direct current motor, which may significantly reduce costs.

2. The magnetorheological actuator can achieve torque output with small inertia, large torque, and high bandwidth. The cable can achieve any forward and reverse pulling, and a damping characteristic of the cable can effectively suppress vibration in a cable tension control process, which can significantly improve force control performance of the cable drive system.

3. The hybrid drive system has a smaller volume than a traditional drive system while achieving high-efficiency output, which is easy to install and has high flexibility.
4. The magnetorheological actuator has lower costs than a same-performance torque motor, and has higher force output performance and lower power consumption.

DESCRIPTION OF THE EMBODIMENTS

The technical solutions of the present invention are described in detail below, but the protection scope of the present invention is not limited to the embodiments.

Figure 1:
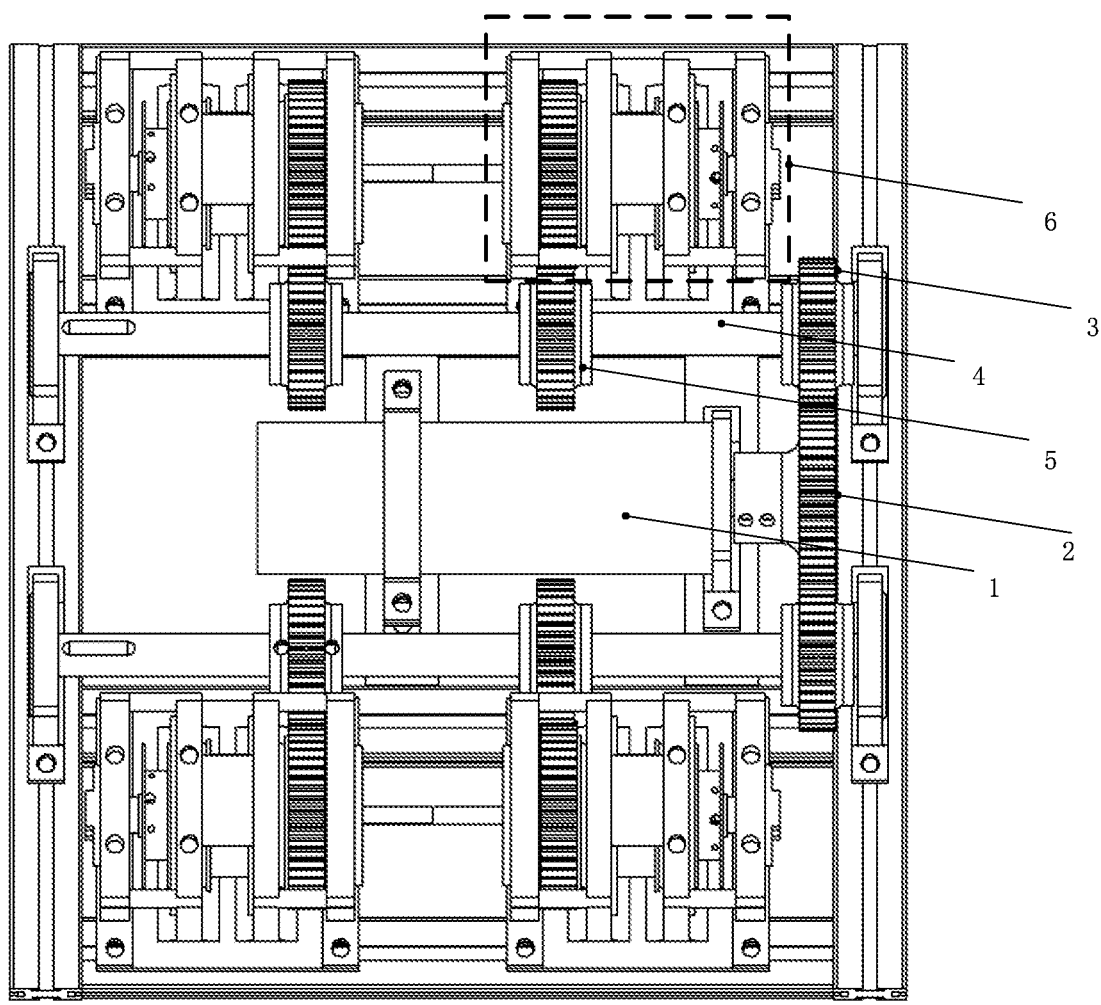
FIG. 1 is a schematic diagram of a four-output mode according to the present invention.
Figure 2:
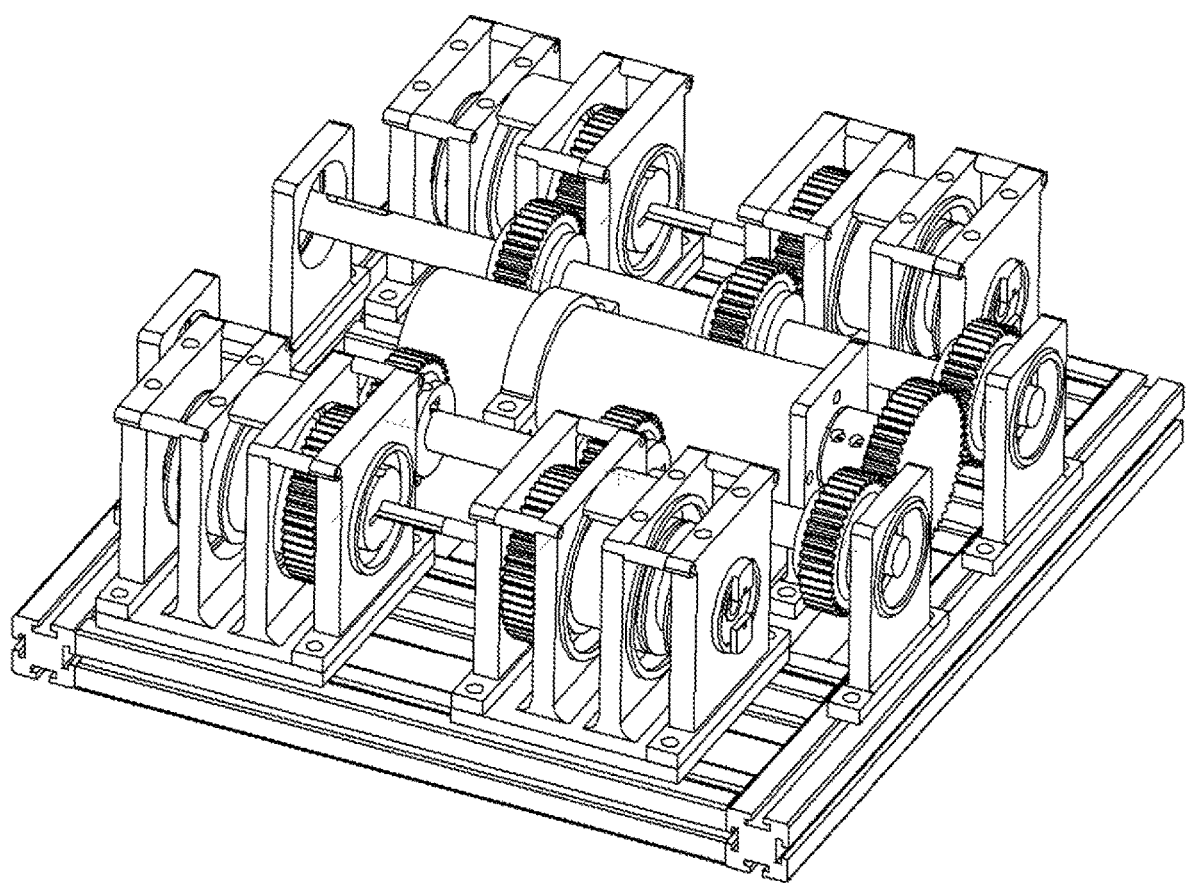
FIG. 2 is a schematic diagram of a stereoscopic structure of a four-output mode according to the present invention.
Figure 3:
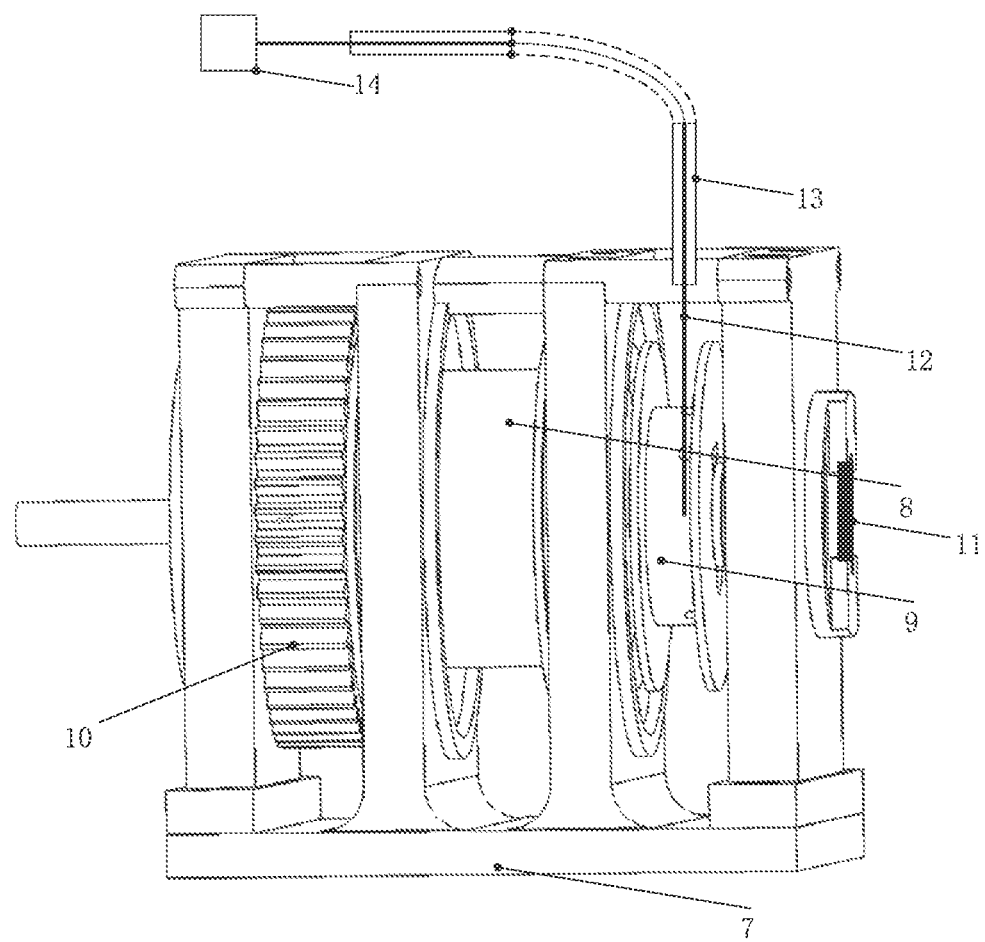
FIG. 3 is a schematic diagram of a magnetorheological actuator module in a distributed active/passive hybrid cable drive system according to the present invention.

As shown in FIG. 1 to FIG. 3, a distributed active/passive hybrid cable drive system in this embodiment includes a direct current motor 1, a motor output gear 2, a plurality of drive gear sets, and a plurality of magnetorheological actuator modules. The direct current motor is separately connected to each drive gear set for driving, and each drive gear set is linked to the corresponding magnetorheological actuator module. Each drive gear set includes a motor drive gear 3, a drive shaft 4, and a magnetorheological drive gear 5, the motor output gear 2 is connected to an output end of the direct current motor 1, the motor output gear 2 is meshed with the corresponding motor drive gear 3, the motor drive gear 3 is installed on the drive shaft 4, and the drive shaft 4 is provided with a plurality of magnetorheological drive gears 5. Each magnetorheological actuator module includes a module frame 7, and a rotary magnetorheological actuator 8, an output reel 9, and a magnetorheological input gear 10 that are installed in the module frame 7. The magnetorheological input gear 10 is fixed on the rotary magnetorheological actuator 8 and is capable of rotating around the module frame 7, the magnetorheological input gear 10 is meshed with the corresponding magnetorheological drive gear 5, an output end of the rotary magnetorheological actuator 8 is fixedly connected to the output reel 9, output torque of the output reel 9 is determined by adjusting damping of the magnetorheological actuator 8, the output reel 9 pulls a cable 12 connected to the output reel, and the cable 12 receives power and transmits the power along a Bowden cable 13 to a controlled object at a tail end, to control the controlled object 14.

An encoder 11 is further disposed on each magnetorheological actuator module, the encoder 11 is installed on the module frame 7 and communicates with the output reel 9, and the encoder 11 measures a rotation angle of the output reel 9, to measure a telescopic length of the cable 12.

In the present invention, a traditional direct current motor is decoupled from output, that is, the motor drives only the magnetorheological actuator to rotate and provides power for the magnetorheological actuator, and the output torque is determined by the output of the magnetorheological actuator. The magnetorheological output characteristic is large torque and small inertia, so that an entire drive system can achieve output with high torque and small inertia, while the entire drive system has a small volume and low costs.

A specific working principle of the foregoing system is as follows:

The direct current motor 1 rotates to provide power, and transfers the power to the magnetorheological actuator module 6 by using the motor output gear 2, the motor drive gear 3, the drive shaft 4, and the magnetorheological drive gear 5. The magnetorheological actuator module 6 is integrated with the magnetorheological drive gear 5 by using the magnetorheological input gear 10, and receives the power. Then the rotary magnetorheological actuator rotates around the module frame 7, then the output torque of the output reel 9 is determined by adjusting the damping of the magnetorheological actuator 8, the output reel 9 pulls the cable 12, and the cable 12 receives power to transfer the power along the Bowden cable 13 to the controlled object at the tail end, to control the controlled object 14.

As shown in FIG. 1 and FIG. 2, if the drive system in this embodiment is in a four-output mode, there are two drive gear sets in total, and there are four magnetorheological actuator modules in total. Motor drive gears 3 in the two drive gear sets are respectively meshed with two ends of the motor output gear 2, each motor drive gear 3 is connected to the corresponding drive shaft 4, two magnetorheological drive gears 5 are disposed on each drive shaft 4, and four magnetorheological drive gears 5 are respectively meshed with the magnetorheological input gear 10 in each magnetorheological actuator module.

Figure 4:
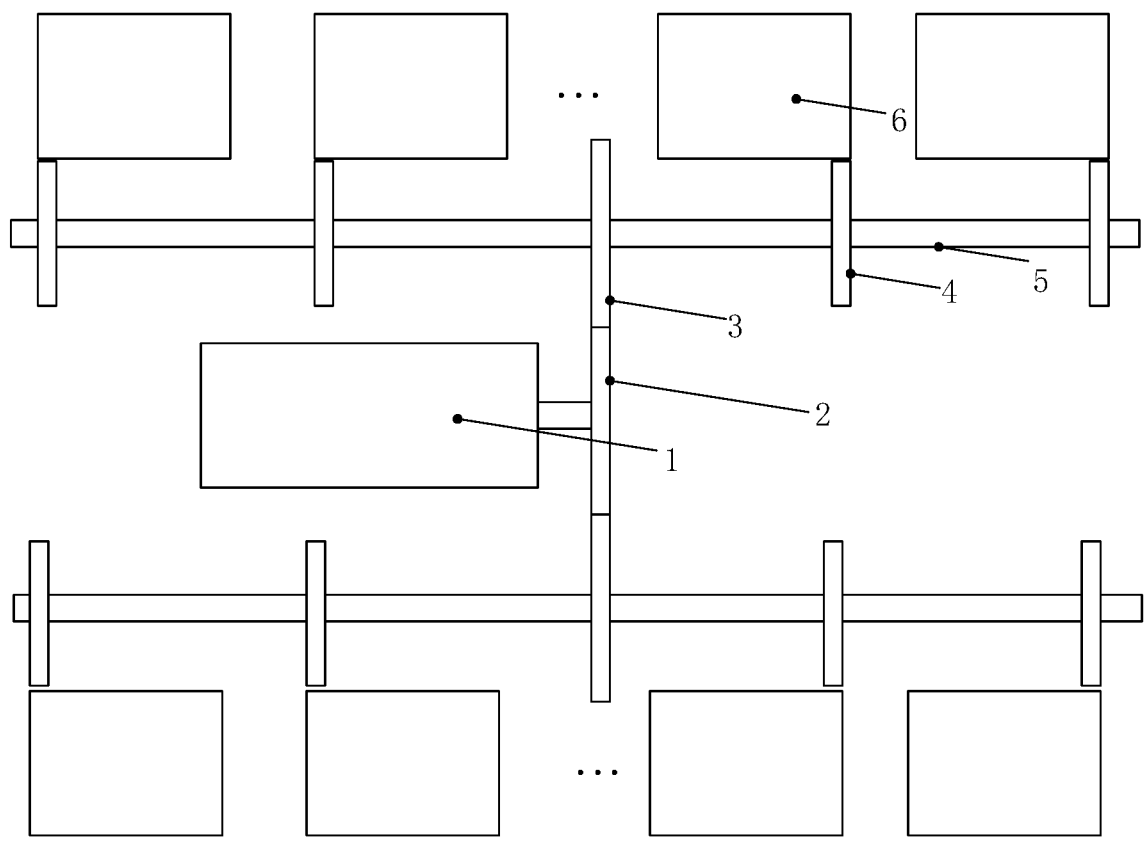
FIG. 4 is a schematic diagram of a multi-output mode of a distributed active/passive hybrid cable drive system according to the present invention.

As shown in FIG. 4, if the drive system in this embodiment is in a multi-output mode, a plurality (for example, 8 sets) of magnetorheological drive gears 5 are disposed on the drive shaft, and a quantity of magnetorheological drive gears 5 corresponds to a quantity of magnetorheological actuator modules.

What is claimed is:

1. A distributed active/passive hybrid cable drive system, comprising a direct current motor (1), a motor output gear (2), a plurality of drive gear sets, and a plurality of magnetorheological actuator modules, wherein the direct current motor is separately connected to each drive gear set for driving, and each drive gear set is linked to the corresponding magnetorheological actuator module;

each drive gear set comprises a motor drive gear (3), a drive shaft (4), and a magnetorheological drive gear (5), the motor output gear (2) is connected to an output end of the direct current motor (1), the motor output gear (2) is meshed with the corresponding motor drive gear (3), the motor drive gear (3) is installed on the drive shaft (4), and the drive shaft (4) is provided with a plurality of magnetorheological drive gears (5); and each magnetorheological actuator module comprises a module frame (7), and a rotary magnetorheological actuator (8), an output reel (9), and a magnetorheological input gear (10) that are installed in the module frame (7); the magnetorheological input gear (10) is fixed on the rotary magnetorheological actuator (8) and is capable of rotating around the module frame (7), the magnetorheological input gear (10) is meshed with the corresponding magnetorheological drive gear (5), an output end of the rotary magnetorheological actuator (8) is fixedly connected to the output reel (9), output torque of the output reel (9) is resulted by damping of the magnetorheological actuator (8), the output reel (9) pulls a cable (12) connected to the output reel, and the cable (12) receives power and transmits the power along a Bowden cable (13) to a controlled object at a tail end, to control the controlled object (14).

2. The distributed active/passive hybrid cable drive system according to claim 1,
wherein an encoder (11) is further disposed on each magnetorheological actuator module, the encoder (11) is installed on the module frame (7) and communicates with the output reel (9), and the encoder (11) measures a rotation angle of the output reel (9), to measure a telescopic length of the cable (12).

3. The distributed active/passive hybrid cable drive system according to claim 1, wherein the direct current motor (1) provides power, and transfers the power to the magnetorheological actuator module (6) by using the motor output gear (2), the motor drive gear (3), the drive shaft (4), and the magnetorheological drive gear (5), the magnetorheological actuator module (6) is integrated with the magnetorheological drive gear (5) by using the magnetorheological input gear (10), and receives the power, then the magnetorheological input gear (10) and the rotary magnetorheological actuator (8) rotates around within the module frame (7) as both members are kinematically locked within the module frame (7), then the output torque of the output reel (9) is resulted by the damping of the magnetorheological actuator (8), the output reel (9) pulls the cable (12), and the cable (12) receives the power to transfer the power along the Bowden cable (13) to the controlled object at the tail end, to control the controlled object (14).

4. The distributed active/passive hybrid cable drive system according to claim 1, wherein there are two drive gear sets in total, and there are four magnetorheological actuator modules in total; motor drive gears (3) in the two drive gear sets are respectively meshed with two ends of the motor output gear (2), each motor drive gear (3) is connected to the corresponding drive shaft (4), two magnetorheological drive gears (5) are disposed on each drive shaft (4), and four magnetorheological drive gears (5) are respectively meshed with the magnetorheological input gear (10) in each magnetorheological actuator module.

5. The distributed active/passive hybrid cable drive system according to claim 1, wherein a plurality of magnetorheological drive gears (5) are disposed on the drive shaft, and a quantity of magnetorheological drive gears (5) corresponds to a quantity of magnetorheological actuator modules.

6. The distributed active/passive hybrid cable drive system according to claim 1, wherein a sum of output power of output ends of the magnetorheological actuator modules is less than or equal to power of the direct current motor.

* * * * *